United States Patent
Yigzaw et al.

(10) Patent No.: US 9,405,646 B2
(45) Date of Patent: Aug. 2, 2016

(54) METHOD AND APPARATUS FOR INJECTING ERRORS INTO MEMORY

(76) Inventors: Theodros Yigzaw, Sherwood, OR (US); Kai Cheng, Portland, OR (US); Mohan J. Kumar, Aloha, OR (US); Jose A. Vargas, Rescue, CA (US); Gopikrishna Jandhyala, Milpitas, CA (US)

( * ) Notice: Subject to any disclaimer, the term of this patent is extended or adjusted under 35 U.S.C. 154(b) by 139 days.

(21) Appl. No.: 13/992,506

(22) PCT Filed: Sep. 29, 2011

(86) PCT No.: PCT/US2011/053956
§ 371 (c)(1),
(2), (4) Date: Jun. 7, 2013

(87) PCT Pub. No.: WO2013/048406
PCT Pub. Date: Apr. 4, 2013

(65) Prior Publication Data
US 2013/0275810 A1 Oct. 17, 2013

(51) Int. Cl.
*G06F 11/00* (2006.01)
*G06F 11/263* (2006.01)
*G06F 11/36* (2006.01)

(52) U.S. Cl.
CPC .......... *G06F 11/263* (2013.01); *G06F 11/3664* (2013.01); *G06F 11/3688* (2013.01)

(58) Field of Classification Search
CPC .............. G06F 11/3672; G06F 11/221; G06F 11/2215; G06F 11/2221; G06F 11/263; G06F 11/2635; G06F 11/1479; G06F 11/366; G06F 11/3664; G06F 11/3688; G11C 29/02; G11C 29/42; G11C 29/54

USPC .......................................................... 714/41
See application file for complete search history.

(56) References Cited

U.S. PATENT DOCUMENTS

| | | | |
|---|---|---|---|
| 4,759,019 A * | 7/1988 | Bentley | G06F 11/2215 714/33 |
| 5,671,352 A | 9/1997 | Subrahmaniam et al. | |
| 5,875,195 A | 2/1999 | Dixon | |
| 7,818,626 B1 | 10/2010 | Tsien et al. | |
| 8,065,573 B2 | 11/2011 | Abts et al. | |
| 2006/0112307 A1 * | 5/2006 | Marisetty | G06F 11/3672 714/11 |
| 2009/0240986 A1 * | 9/2009 | Warren | G06F 11/263 714/32 |
| 2011/0161592 A1 | 6/2011 | Nachimuthu et al. | |

FOREIGN PATENT DOCUMENTS

JP 05-134018 A 5/1993

OTHER PUBLICATIONS

PCT International Search Report for PCT Counterpart Application No. PCT/US2011/053956, 3 pgs., (May 2, 2012).

(Continued)

*Primary Examiner* — Bryce Bonzo
*Assistant Examiner* — Anthony J Amoroso
(74) *Attorney, Agent, or Firm* — Nicholson Devos; Webster & Elliott LLP

(57) ABSTRACT

Disclosed is an apparatus and a method to inject errors to a memory. In one embodiment, a dedicated interface includes an error injection system address register and an error injection mask register coupled to the error injection system address register. If the error injection system address register includes a system address that matches an incoming write address, the error injection mask register outputs an error to the memory.

20 Claims, 4 Drawing Sheets

(56) References Cited

OTHER PUBLICATIONS

PCT Written Opinion of the International Searching Authority for PCT Counterpart Application No. PCT/US2011/053956, 5 pgs., (May 2, 2012).
PCT Notification concerning Transmittal of International Preliminary Report on Patentability (Chapter I of the Patent Cooperation Treaty) for PCT Counterpart Application No. PCT/US2011/053956, 7 pgs., (Apr. 10, 2014).
English translation of Japanese Application No. 2014-533256 Office Action, 3 pages (Jun. 16, 2015).
English translation of Korean Application No. 10-2014-7008424 Office Action, 4 pages (May 20, 2015).
Office action with English translation from Korean Patent Application No. 10-2014-7008424, mailed May 20, 2015, 9 pages.
Office action with English translation from Japanese Patent Application No. 2014-533256, mailed Jun. 16, 2015, 8 pages.

* cited by examiner

METHOD AND APPARATUS FOR INJECTING ERRORS INTO MEMORY

CROSS-REFERENCE TO RELATED APPLICATION

This patent application is a U.S. National Phase Application under 35 U.S.C. §371 of International Application No. PCT/US2011/053956, filed Sep. 29, 2011, entitled METHOD AND APPARATUS FOR INJECTING ERRORS INTO MEMORY.

BACKGROUND

1. Field of the Invention

Embodiments of the invention generally relate to a method and apparatus for injecting errors into memory.

2. Description of the Related Art

In order to develop and validate complex error handling and error recovery software (SW), SW vendors, such as, operating systems (OS) vendors, virtual machine managers (VMM), etc., desire a simple interface that can inject errors to a given system address for software testing.

In present implementations, there is not a simple interface that can be used for injecting errors into memory. Instead, complex methods are utilized that involve basic input/output system (BIOS) utilization and designed for testing (DFx) error injection mechanisms, which are used to effect the error injection.

Unfortunately, these methods are complex and include many design problem issues associated with each product to be tested. Further, these methods are typically non-portable because they have to be "re-invented" for each product to be tested. For example, a given system address has to be translated into a memory address (since DFx mechanisms work with memory addresses) and they may also require help from microcode to unlock certain capabilities that were meant to be used only for a particular product to be tested.

Therefore, it would be beneficial to utilize a simple interface for injecting errors to test a product.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

The following are exemplary computer systems that may be utilized with embodiments of the invention to be hereinafter discussed and for executing instruction(s) detailed herein. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 1:
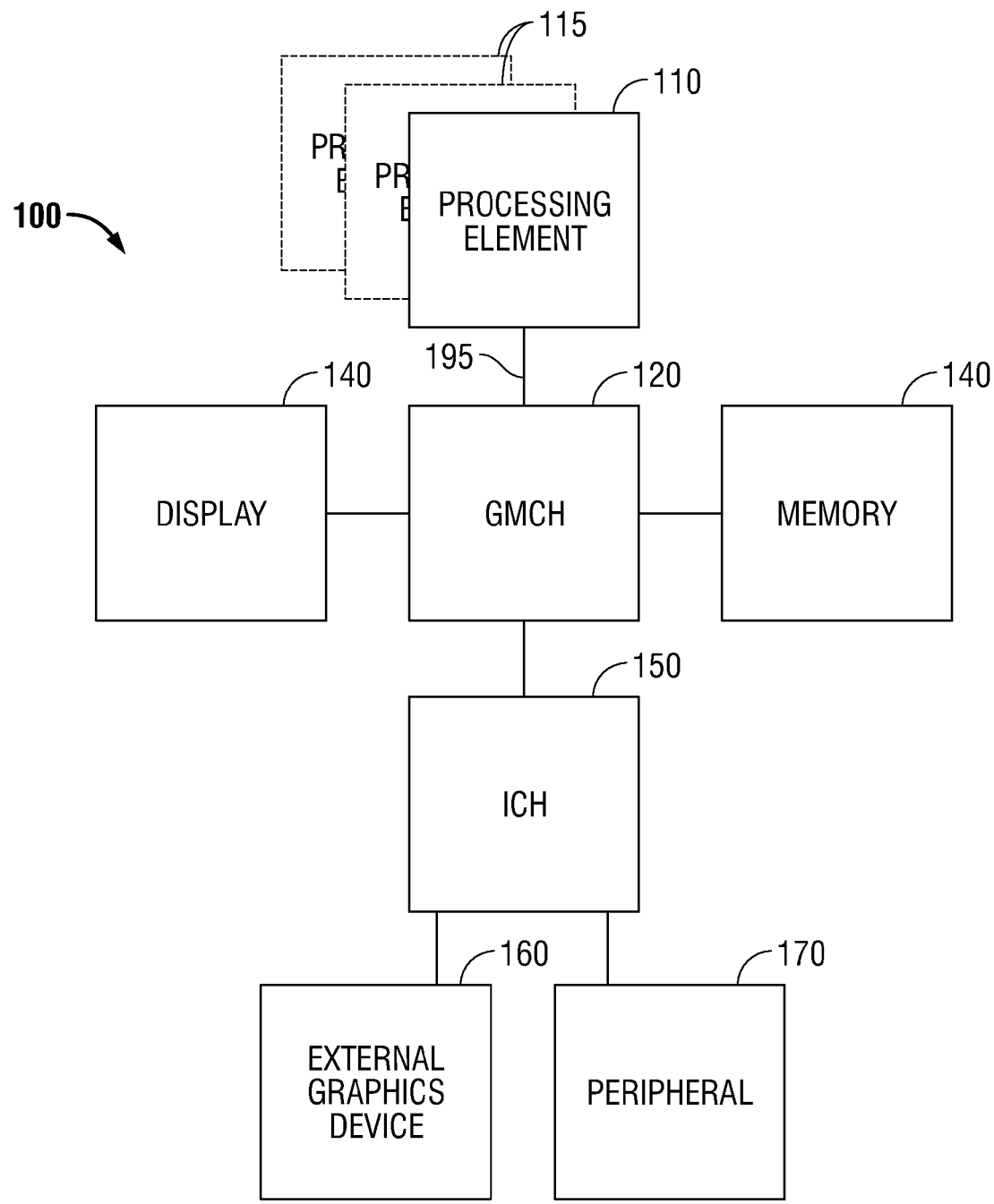
FIG. 1 illustrates a computer system architecture that may be utilized with embodiments of the invention.

Referring now to FIG. 1, shown is a block diagram of a computer system 100 in accordance with one embodiment of the present invention. The system 100 may include one or more processing elements 110, 115, which are coupled to graphics memory controller hub (GMCH) 120. The optional nature of additional processing elements 115 is denoted in FIG. 1 with broken lines. Each processing element may be a single core or may, alternatively, include multiple cores. The processing elements may, optionally, include other on-die elements besides processing cores, such as integrated memory controller and/or integrated I/O control logic. Also, for at least one embodiment, the core(s) of the processing elements may be multithreaded in that they may include more than one hardware thread context per core.

FIG. 1 illustrates that the GMCH 120 may be coupled to a memory 140 that may be, for example, a dynamic random access memory (DRAM). The DRAM may, for at least one embodiment, be associated with a non-volatile cache. The GMCH 120 may be a chipset, or a portion of a chipset. The GMCH 120 may communicate with the processor(s) 110, 115 and control interaction between the processor(s) 110, 115 and memory 140. The GMCH 120 may also act as an accelerated bus interface between the processor(s) 110, 115 and other elements of the system 100. For at least one embodiment, the GMCH 120 communicates with the processor(s) 110, 115 via a multi-drop bus, such as a frontside bus (FSB) 195. Furthermore, GMCH 120 is coupled to a display 140 (such as a flat panel display). GMCH 120 may include an integrated graphics accelerator. GMCH 120 is further coupled to an input/output (I/O) controller hub (ICH) 150, which may be used to couple various peripheral devices to system 100. Shown for example in the embodiment of FIG. 1 is an external graphics device 160, which may be a discrete graphics device coupled to ICH 150, along with another peripheral device 170.

Alternatively, additional or different processing elements may also be present in the system 100. For example, additional processing element(s) 115 may include additional processors(s) that are the same as processor 110, additional processor(s) that are heterogeneous or asymmetric to processor 110, accelerators (such as, e.g., graphics accelerators or digital signal processing (DSP) units), field programmable gate arrays, or any other processing element. There can be a variety of differences between the physical resources 110, 115 in terms of a spectrum of metrics of merit including architectural, microarchitectural, thermal, power consumption characteristics, and the like. These differences may effectively manifest themselves as asymmetry and heterogeneity amongst the processing elements 110, 115. For at least one embodiment, the various processing elements 110, 115 may reside in the same die package.

Figure 2:
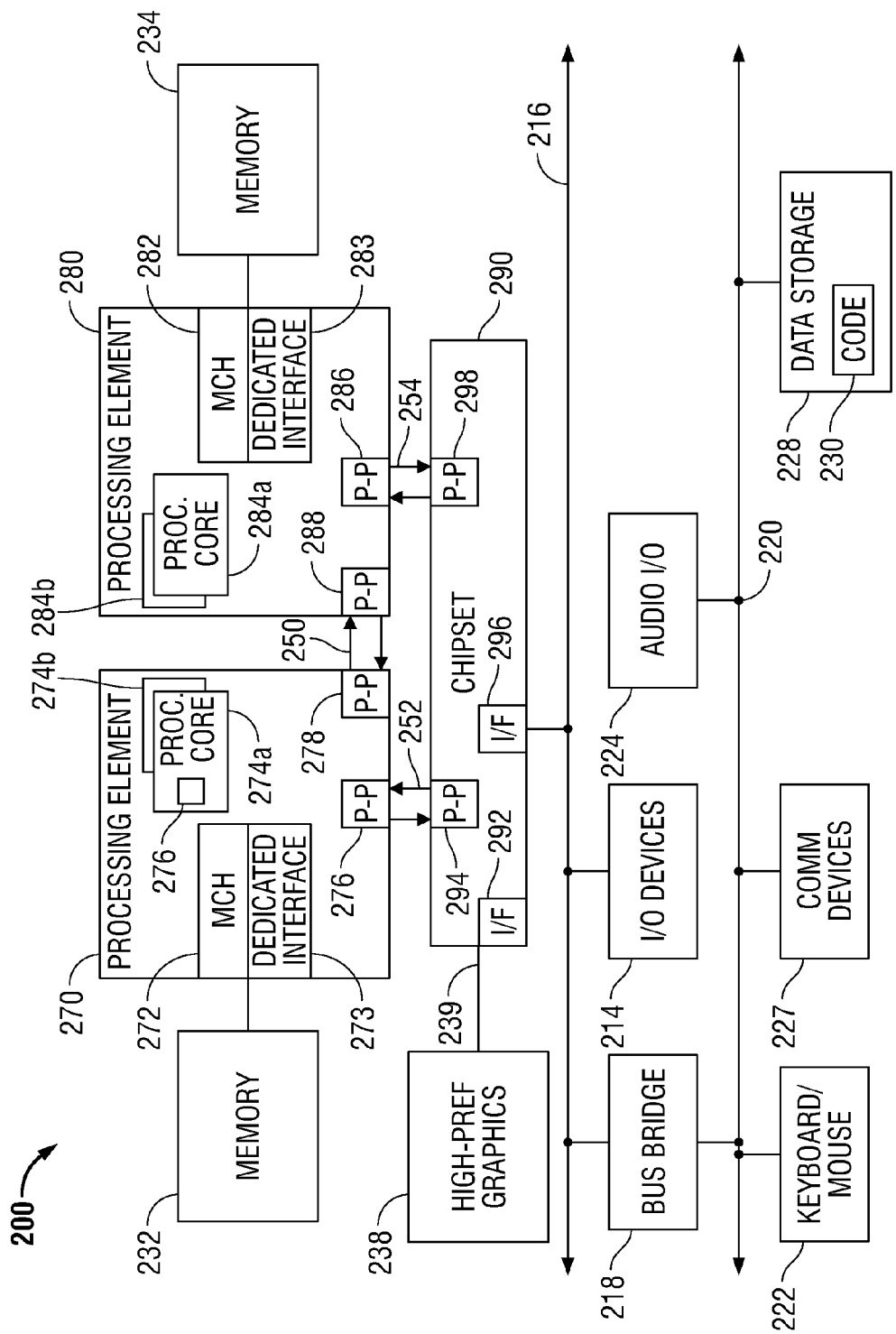
FIG. 2 illustrates a computer system architecture that may be utilized with embodiments of invention.

Referring now to FIG. 2, shown is a block diagram of another computer system 200 in accordance with an embodiment of the present invention. As shown in FIG. 2, multiprocessor system 200 is a point-to-point interconnect system, and includes a first processing element 270 and a second processing element 280 coupled via a point-to-point interconnect 250. As shown in FIG. 2, each of processing elements 270 and 280 may be multicore processors, including first and second processor cores (i.e., processor cores 274a and 274b and processor cores 284a and 284b). Alternatively, one or more of processing elements 270, 280 may be an element other than a processor, such as an accelerator or a field programmable gate array. While shown with only two processing elements 270, 280, it is to be understood that the scope of the present invention is not so limited. In other embodiments, one or more additional processing elements may be present in a given processor.

First processing element 270 may further include a memory controller hub (MCH) 272 that includes a dedicated interface 273, as will be hereinafter described, and point-to-point (P-P) interfaces 276 and 278. Similarly, second processing element 280 may include a MCH 282 that includes a dedicated interface 283, as will be hereinafter described, and P-P interfaces 286 and 288. Processors 270, 280 may exchange data via a point-to-point (PtP) interface 250 using PtP interface circuits 278, 288. As shown in FIG. 2, MCH's 272 and 282 couple the processors to respective memories, namely a memory 242 and a memory 244, which may be portions of main memory locally attached to the respective processors.

Processors 270, 280 may each exchange data with a chipset 290 via individual PtP interfaces 252, 254 using point to point interface circuits 276, 294, 286, 298. Chipset 290 may also exchange data with a high-performance graphics circuit 238 via a high-performance graphics interface 239. Embodiments of the invention may be located within any processing element having any number of processing cores. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode. First processing element 270 and second processing element 280 may be coupled to a chipset 290 via P-P interconnects 276, 286 and 284, respectively. As shown in FIG. 2, chipset 290 includes P-P interfaces 294 and 298. Furthermore, chipset 290 includes an interface 292 to couple chipset 290 with a high performance graphics engine 248. In one embodiment, bus 249 may be used to couple graphics engine 248 to chipset 290. Alternately, a point-to-point interconnect 249 may couple these components. In turn, chipset 290 may be coupled to a first bus 216 via an interface 296. In one embodiment, first bus 216 may be a Peripheral Component Interconnect (PCI) bus, or a bus such as a PCI Express bus or another third generation I/O interconnect bus, although the scope of the present invention is not so limited.

As shown in FIG. 2, various I/O devices 214 may be coupled to first bus 216, along with a bus bridge 218 which couples first bus 216 to a second bus 220. In one embodiment, second bus 220 may be a low pin count (LPC) bus. Various devices may be coupled to second bus 220 including, for example, a keyboard/mouse 222, communication devices 226 and a data storage unit 228 such as a disk drive or other mass storage device which may include code 230, in one embodiment. Further, an audio I/O 224 may be coupled to second bus 220. Note that other architectures are possible. For example, instead of the point-to-point architecture of, a system may implement a multi-drop bus or other such architecture.

In one embodiment, processing element 270 may include a MCH 272 that includes a dedicated interface 273. It should be appreciated that other processing elements may include MCHs that likewise include dedicated interfaces (e.g., dedicated interface 283 of processing element 280). As will be described, dedicated interface 273 of MCH 272 may be used by testing software of a computer system 200 to program a system address where an error is to be injected and may include a mask register to select what kind of error is to be injected.

Figure 3:
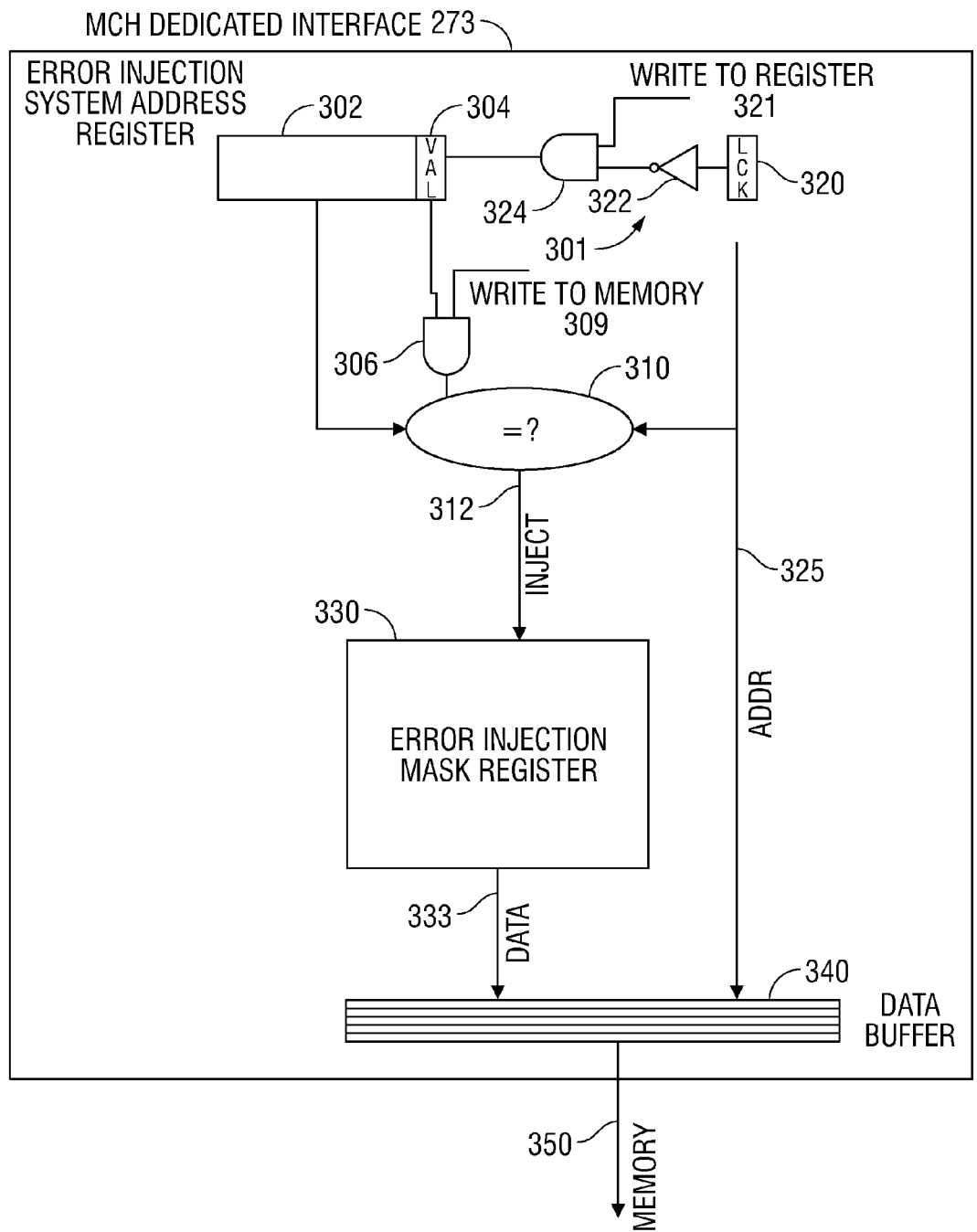
FIG. 3 is a block diagram of an MCH dedicated interface, according to one embodiment of the invention.

Turning now to FIG. 3, a block diagram of the MCH dedicated interface 273 is illustrated, according to one embodiment of the invention. In one embodiment, the MCH dedicated interface 273 includes an error injection system address register 302 and an error injection mask register 330 coupled to the error injection system address register. If the error injection system address register 302 includes a system address that matches an incoming write address 325, the error injection mask register 330 outputs an error to memory 350.

An overview of the MCH dedicated interface 273 will now be provided. As shown in FIG. 3, an error injection system address register 302 is provided such that testing software of a computer system can program the desired system address where an error is to be injected. Logic 310 is also provided to look for a match between this programmed address and the address 325 for incoming requests. Once the system address has been programmed into the error injection system address register 302, testing software can then perform a write to this system address 325. An address match may then trigger an error (e.g., data 333) into that location of memory 350. The type of error (corrected or uncorrected) can be selected by software programming of the error injection mask register 330 which control which bits are to contain the error. As an example, the MCH dedicated interface 273 may be used with the MCH 272 of the processing element 270 of computer system 200 associated with memory 232, but, as should be appreciated, may be utilized with any computer system. For example, embodiments of the invention may be implemented with computer system 100 of FIG. 1.

As one example, as shown in FIG. 3, a locking mechanism 301 may be coupled to the error injection system address register 302, for the purpose of security. As a particular example, the locking mechanism 301 may be unlocked during the system management mode (SMM). The testing software may unlock lock 320 coupled through inverter 322 to AND gate 324 and may transmit a write to register 321 to AND gate 324. In this way, a valid bit 304 may be set in the error injection system address register 302 and the system is unlocked.

As previously described, the testing software may submit the error injection system address to error injection system address register 302. Decision logic block 310 is utilized to look for a match between the testing software program write address 325 and the error injection system address 302. In particular, if a write to memory signal 309 and a valid signal 304 are received by AND gate 306 sending a signal to decision logic block 310 and decision logic block 310 matches the error injection system address from register 302 with the testing software program write address 325 then decision logic block 310 transmits an error injection signal 312 to error injection mask register 330.

Therefore, once the error injection system address has been programmed into the register 302, testing software can then perform a write to system address 325, and once an address match is determined by decision logic block 310, decision block 310 can trigger an error injection signal 312 to be injected into that location through the error injection mask register 330. The type of error (corrected or uncorrected) can be selected by the testing software pre-programming the data mask registers of the error injecting mask register 330 which controls which bits are to contain the error. As can be seen in FIG. 3, data error 333 can be submitted through data buffer 340 to memory 350 for testing purposes.

In this way, this previously-described structure and methodology allows for the injection of memory errors 333 (corrected or uncorrected) into memory 350 for detecting and correcting software problems by testing software of computer system 200.

Figure 4:
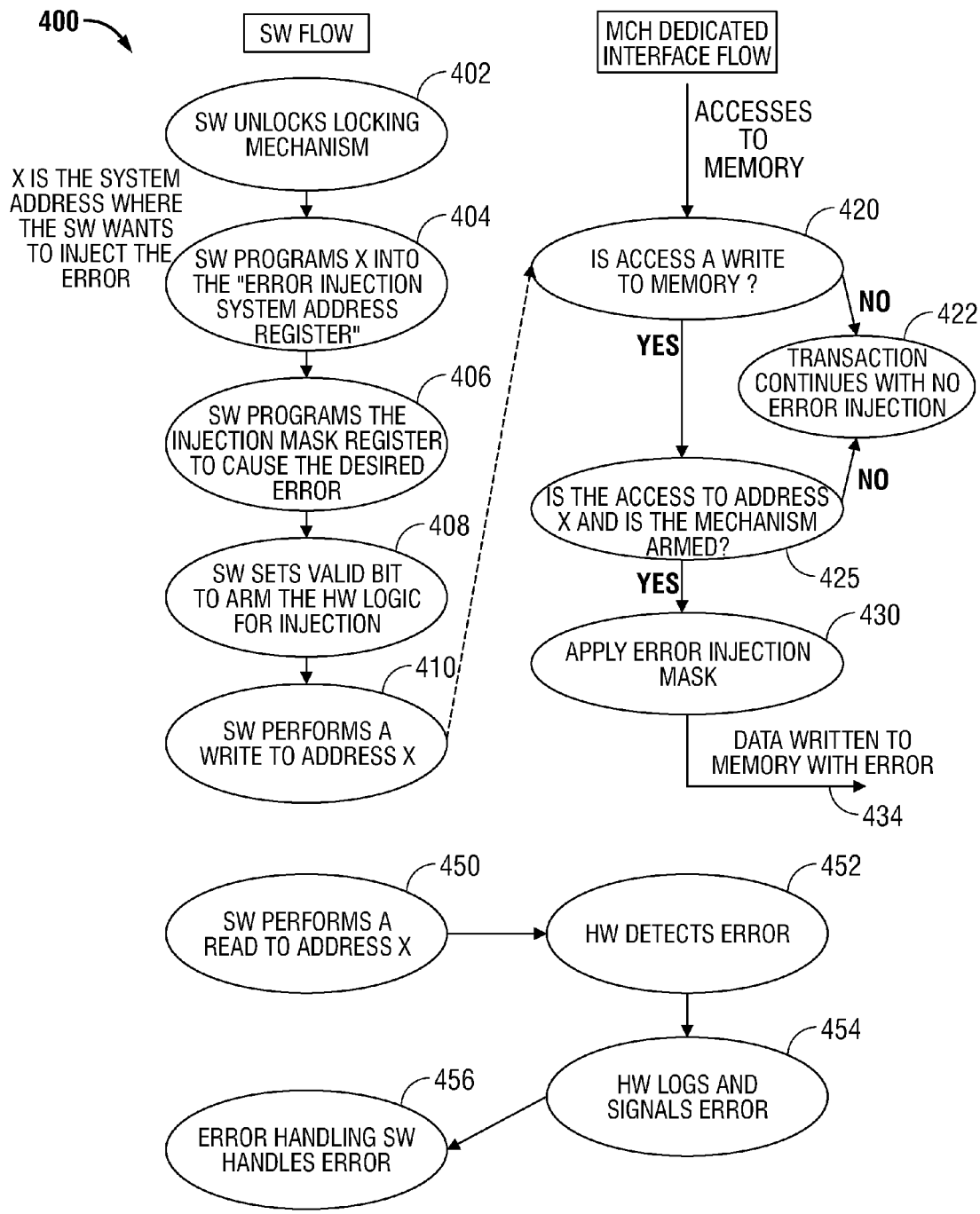
FIG. 4 is a flow diagram 400 that illustrates the testing software flow and the MCH dedicated interface flow (e.g., hardware (HW) flow), according to one embodiment of the invention.

With additional reference to FIG. 4, FIG. 4 is a flow diagram 400 that illustrates the testing software flow and the MCH dedicated interface flow (e.g., hardware (HW) flow). As can be seen in FIG. 4, the testing software unlocks the locking mechanism 301, as previously described (circle 402). Next, the testing software programs X into the error injection system address register 302 (circle 404). It should be appreciated that X is the system address where the testing software wants to inject the error.

Next, the testing software programs the error injection mask register 330 to cause the desired error (circle 406). Further, the testing software sets the valid bit 304 to arm the hardware logic for injection (circle 408). Next, the testing software performs a write into address X (circle 410).

Turning to the hardware or MCH dedicated interface flow it is determined whether there is an access to write to memory (decision circle 420). If not, the transaction continues with no error injected (circle 422). However, if it is a write to memory, then it is determined if the access is to address X and whether the mechanism is armed (decision circle 425). If not, the transaction continues with no error injected (circle 422).

However, if the mechanism is armed and the access is to address X (e.g., determined by logic block 310) then the error injection mask 330 may be applied (circle 430). In this instance, data 333 is written to memory 350 with error 434. As previously described, the type of error (corrected or uncorrected) can be selected by the testing software pre-programming the data mask registers of the error injecting mask register 330 which controls which bits are to contain the error.

Further, the testing software may perform a read to address X (circle 450) and the hardware may detect an error (circle 452). The hardware may then log and signal an error (circle 454) and the error handling software may handle the error (circle 456).

In this way, this previously-described structure and methodology allows for the injection of memory errors (corrected or uncorrected) into memory for detecting and correcting software problems by testing software of a computer system. Further, use of the embodiments of the dedicated interface and the software methodology previously described may be used to satisfy error injection requirements by software vendors, such as operating system vendors and virtual machine management vendors, as well as original equipment manufacturers. The invention previously described provides a simple interface that may be specifically designed for injecting errors into memory for testing. In particular, the methodology allows for injections of memory errors (corrected and/or uncorrected) for detection and correction. In essence, the structure and methodology previously described allows for true error injections into memory and allows for development and validation error recovery flows.

Embodiments of the mechanisms disclosed herein may be implemented in hardware, software, firmware, or a combination of such implementation approaches. Embodiments of the invention may be implemented as computer programs or program code executing on programmable systems comprising at least one processor, a data storage system (including volatile and non-volatile memory and/or storage elements), at least one input device, and at least one output device.

Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Such machine-readable storage media may include, without limitation, non-transitory, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions for performing the operations embodiments of the invention or containing design data, such as HDL, which defines structures, circuits, apparatuses, processors and/or system features described herein. Such embodiments may also be referred to as program products.

Certain operations of the instruction(s) disclosed herein may be performed by hardware components and may be embodied in machine-executable instructions that are used to cause, or at least result in, a circuit or other hardware component programmed with the instructions performing the operations. The circuit may include a general-purpose or special-purpose processor, or logic circuit, to name just a few examples. The operations may also optionally be performed by a combination of hardware and software. Execution logic and/or a processor may include specific or particular circuitry or other logic responsive to a machine instruction or one or more control signals derived from the machine instruction to store an instruction specified result operand. For example, embodiments of the instruction(s) disclosed herein may be executed in one or more the systems of FIGS. 1 and 2 and embodiments of the instruction(s) may be stored in program code to be executed in the systems. Additionally, the processing elements of these figures may utilize one of the detailed pipelines and/or architectures (e.g., the in-order and out-of-order architectures) detailed herein. For example, the decode unit of the in-order architecture may decode the instruction(s), pass the decoded instruction to a vector or scalar unit, etc.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. An apparatus to inject errors to a memory comprising:
    an error injection system address register to store a system address; and
    an error injection mask register coupled to an output of the error injection system address register, wherein when the system address matches an incoming write address, the error injection mask register to output a programmed error to the memory.

2. The apparatus of claim 1, wherein the apparatus is a component of a memory control hub (MCH) of a processor.

3. The apparatus of claim 1, wherein the error includes at least one of a corrected error or an uncorrected error.

4. The apparatus of claim 1, further comprising a locking mechanism coupled to the error injection system address register, the locking mechanism to lock or unlock the error injection system address register such that the error injection mask register is enabled to output the error to the memory or not enabled to output the error to the memory, respectively.

5. The apparatus of claim 4, wherein the locking mechanism further comprises a valid bit of the error injection system address register.

6. The apparatus of claim 4, further comprising a logic block, wherein the logic block transmits an error injection signal to the error injection mask register such that the error injection mask register outputs the error to the memory.

7. The apparatus of claim 6, wherein the logic block transmits the error injection signal to the error injection mask register if the locking mechanism is unlocked and the system address matches the incoming write address.

8. A computer system comprising:
    a memory;
    a processor for processing instructions; and
    a memory control hub (MCH) including a dedicated interface to inject an error to the memory, the dedicated interface comprising:
        an error injection system address register to store a system address; and
        an error injection mask register coupled to an output of the error injection system address register, wherein when the system address matches an incoming write address, the error injection mask register to output a programmed error to the memory.

9. The computer system of claim 8, wherein the error includes at least one of a corrected error or an uncorrected error.

10. The computer system of claim 8, further comprising a locking mechanism coupled to the error injection system address register, the locking mechanism to lock or unlock the error injection system address register such that the error injection mask register is enabled to output the error to the memory or not enabled to output the error to the memory, respectively.

11. The computer system of claim 10, wherein the locking mechanism further comprises a valid bit of the error injection system address register.

12. The computer system of claim 10, further comprising a logic block, wherein the logic block transmits an error injection signal to the error injection mask register such that the error injection mask register outputs the error to the memory.

13. The computer system of claim 12, wherein the logic block transmits the error injection signal to the error injection mask register if the locking mechanism is unlocked and the system address matches the incoming write address.

14. A method to inject errors to a memory comprising:
    receiving a system address from testing software at an error injection system address register;
    determining if the system address of the error injection system address register matches an incoming write address; and
    when the system address matches the incoming write address, commanding an error injection mask register to output an error to the memory.

15. The method of claim 14, further comprising pre-programming the error injection mask register with the error.

16. The method of claim 15, wherein the error includes at least one of a corrected error or an uncorrected error.

17. The method of claim 14, wherein a locking mechanism is coupled to the error injection system address register, the locking mechanism to lock or unlock the error injection system address register such that the error injection mask register is enabled to output the error to the memory or not enabled to output the error to the memory, respectively.

18. The method claim 17, wherein the locking mechanism further comprises a valid bit of the error injection system address register.

19. The method of claim 17, further comprising transmitting an error injection signal to the error injection mask register such that the error injection mask register outputs the error to the memory.

20. The method of claim 19, further comprising transmitting the error injection signal to the error injection mask register if the locking mechanism is unlocked and the system address matches the incoming write address.

* * * * *